US010017048B2

(12) United States Patent
Manhire

(10) Patent No.: US 10,017,048 B2
(45) Date of Patent: Jul. 10, 2018

(54) ACTIVE GRILLE SHUTTER FOR CURVED SURFACE

(71) Applicant: MAGNA EXTERIORS INC., Concord (CA)

(72) Inventor: Jeffrey B. Manhire, Rochester, MI (US)

(73) Assignee: Magna Exteriors Inc., Concord (CA)

( * ) Notice: Subject to any disclaimer, the term of this patent is extended or adjusted under 35 U.S.C. 154(b) by 0 days.

(21) Appl. No.: 15/306,952

(22) PCT Filed: May 5, 2015

(86) PCT No.: PCT/US2015/029262
§ 371 (c)(1),
(2) Date: Oct. 26, 2016

(87) PCT Pub. No.: WO2015/171623
PCT Pub. Date: Nov. 12, 2015

(65) Prior Publication Data
US 2017/0050510 A1 Feb. 23, 2017

Related U.S. Application Data

(60) Provisional application No. 61/988,513, filed on May 5, 2014.

(51) Int. Cl.
*B60K 11/08* (2006.01)
*B60R 19/52* (2006.01)

(52) U.S. Cl.
CPC ............ *B60K 11/085* (2013.01); *B60R 19/52* (2013.01); *B60R 2019/525* (2013.01)

(58) Field of Classification Search
CPC ...... B62D 25/085; B60K 11/08; B60K 11/085
See application file for complete search history.

(56) References Cited

U.S. PATENT DOCUMENTS 4,693,506 A * 9/1987 Massengill .......... B62D 35/001
296/180.3
5,516,178 A * 5/1996 Grant ................. B62D 33/0273
296/180.5

(Continued)

FOREIGN PATENT DOCUMENTS

DE 3145414 A1 6/1982
WO 2013/099527 A1 7/2013

OTHER PUBLICATIONS

International Search Report for International Application No. PCT/US2015/029262.

*Primary Examiner* — Paul N Dickson
*Assistant Examiner* — Vaughn Coolman
(74) *Attorney, Agent, or Firm* — Warn Partners, P.C.

(57) ABSTRACT

An active grille shutter system having a frame with a first side facing a vehicle exterior and a second side opposite the first side that generally faces a vehicle engine compartment. The frame also includes at least two opposing cross-sectional curvilinear sides that form part of a curvilinear opening to allow air to selectively pass through the frame from the first side to the second side. Multiple rotatable vanes are placed within the curvilinear opening in order to selectively block airflow through the frame member. During operation of the active grille shutter system the vanes do not extend beyond the perimeter of the curvilinear opening of the frame when in the open and closed position.

20 Claims, 10 Drawing Sheets

(56) References Cited

U.S. PATENT DOCUMENTS

| | | | | |
|---|---|---|---|---|
| 5,765,307 | A * | 6/1998 | Grimes | E06L 39/36 40/503 |
| 6,099,069 | A * | 8/2000 | Spears | B60T 1/16 296/180.2 |
| 8,312,676 | B2 * | 11/2012 | Maciulewicz | E06L 37/086 40/492 |
| 8,550,887 | B2 * | 10/2013 | Walters | B60K 11/085 454/155 |
| 2007/0169725 | A1 * | 7/2007 | Harich | B60K 11/085 123/41.05 |
| 2013/0223980 | A1 * | 8/2013 | Pastrick | B60K 11/085 415/1 |
| 2014/0273807 | A1 * | 9/2014 | Frayer, III | B60K 11/085 454/335 |
| 2015/0050875 | A1 * | 2/2015 | Knauer | B60K 11/085 454/152 |

\* cited by examiner

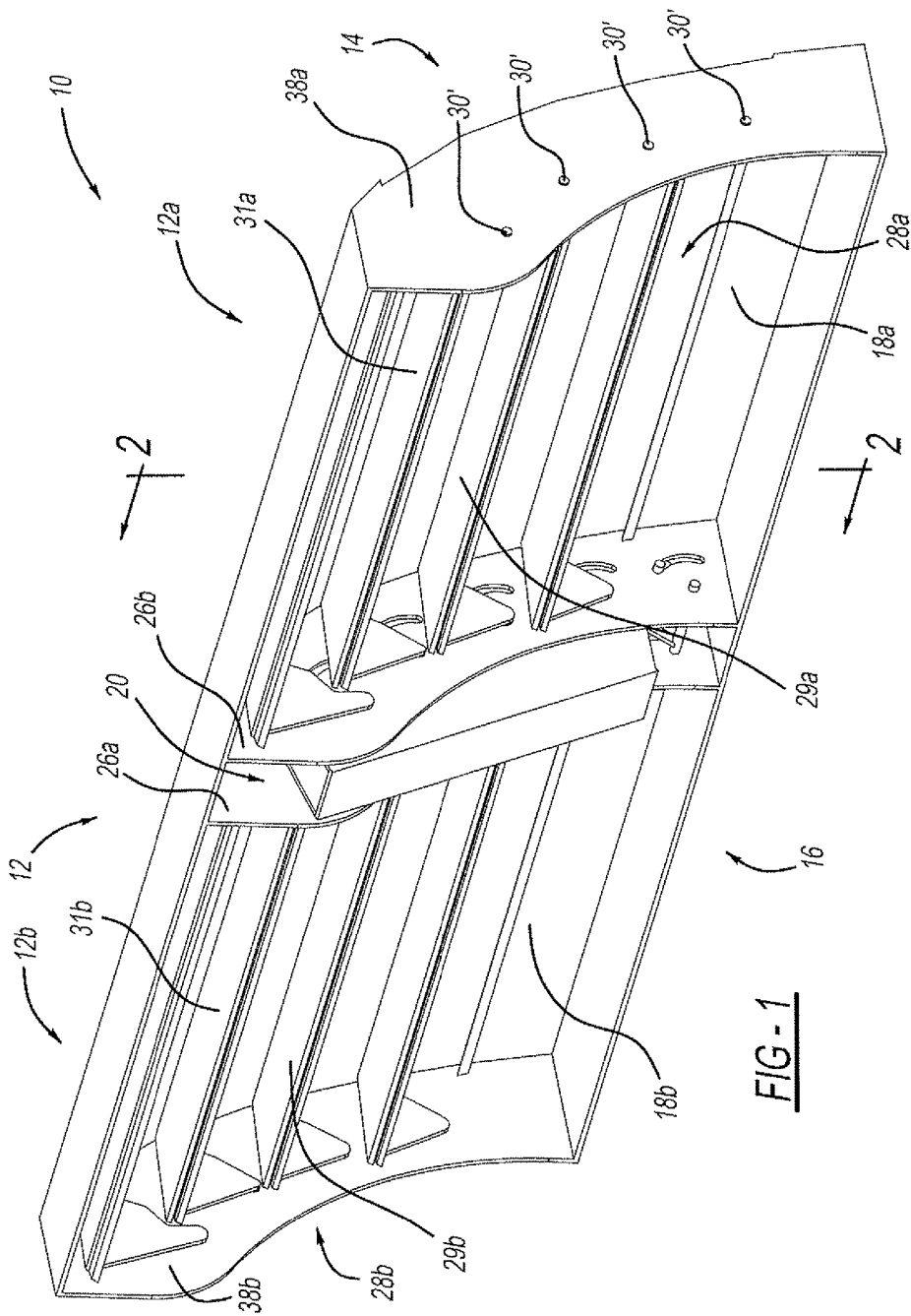

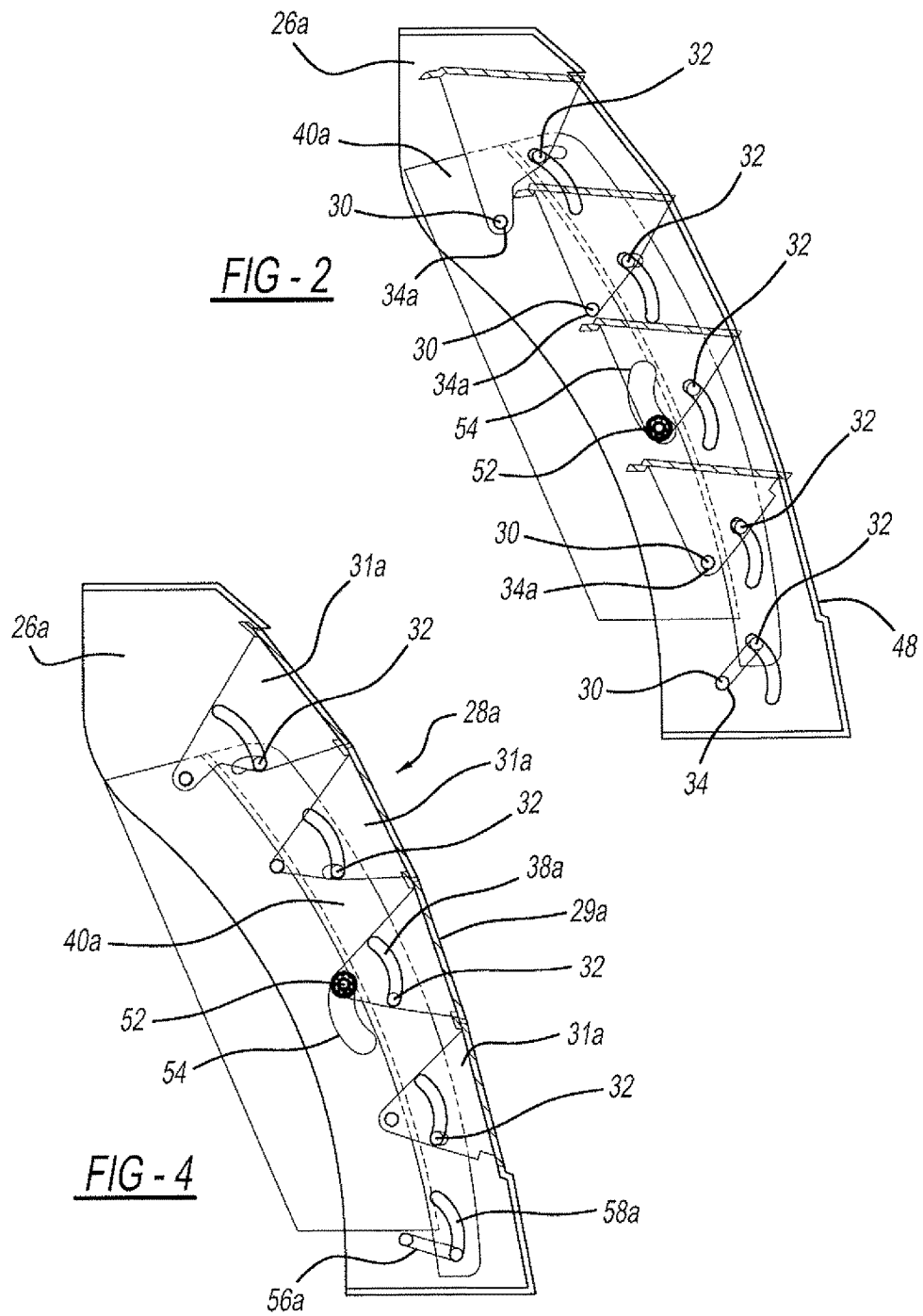

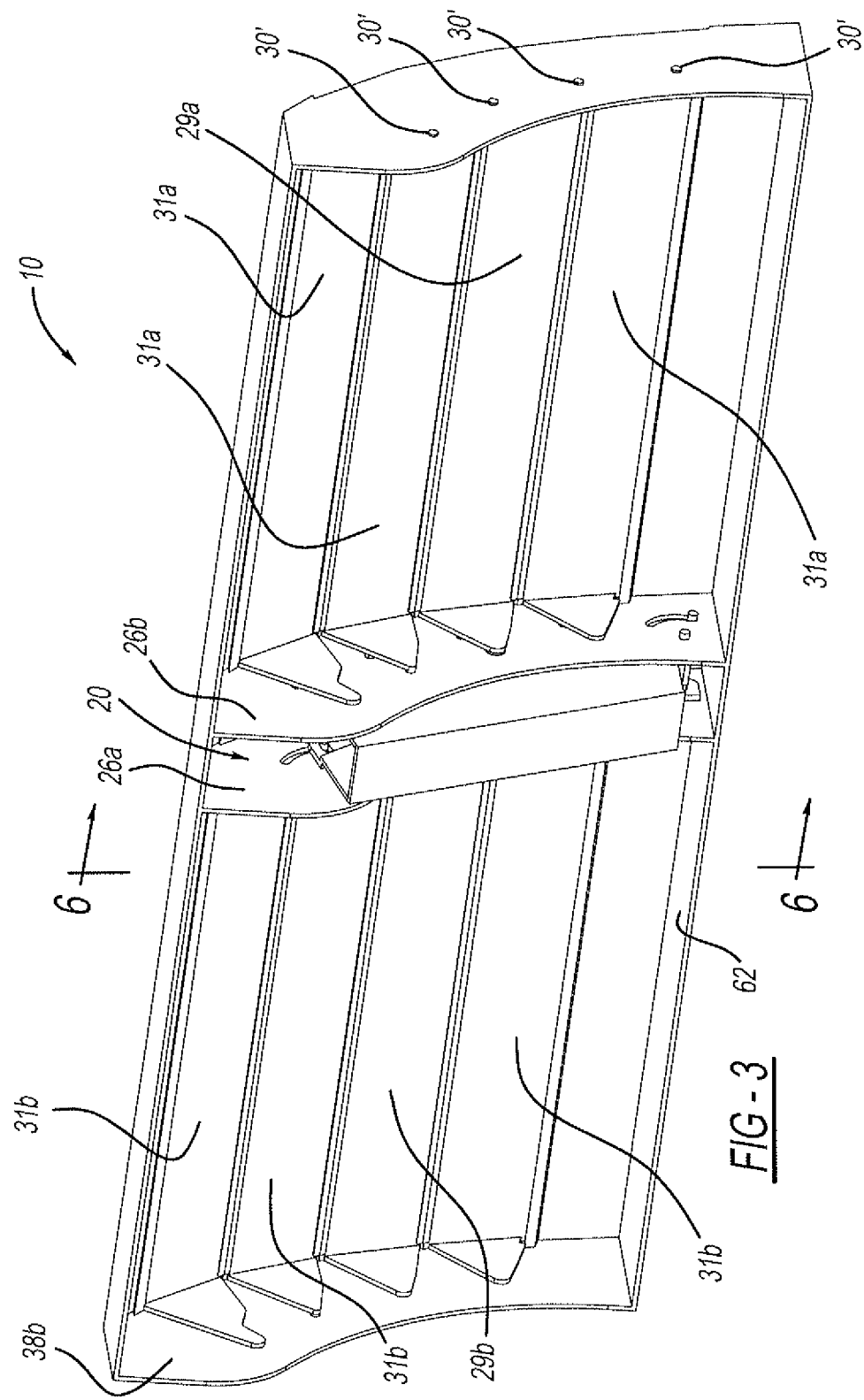

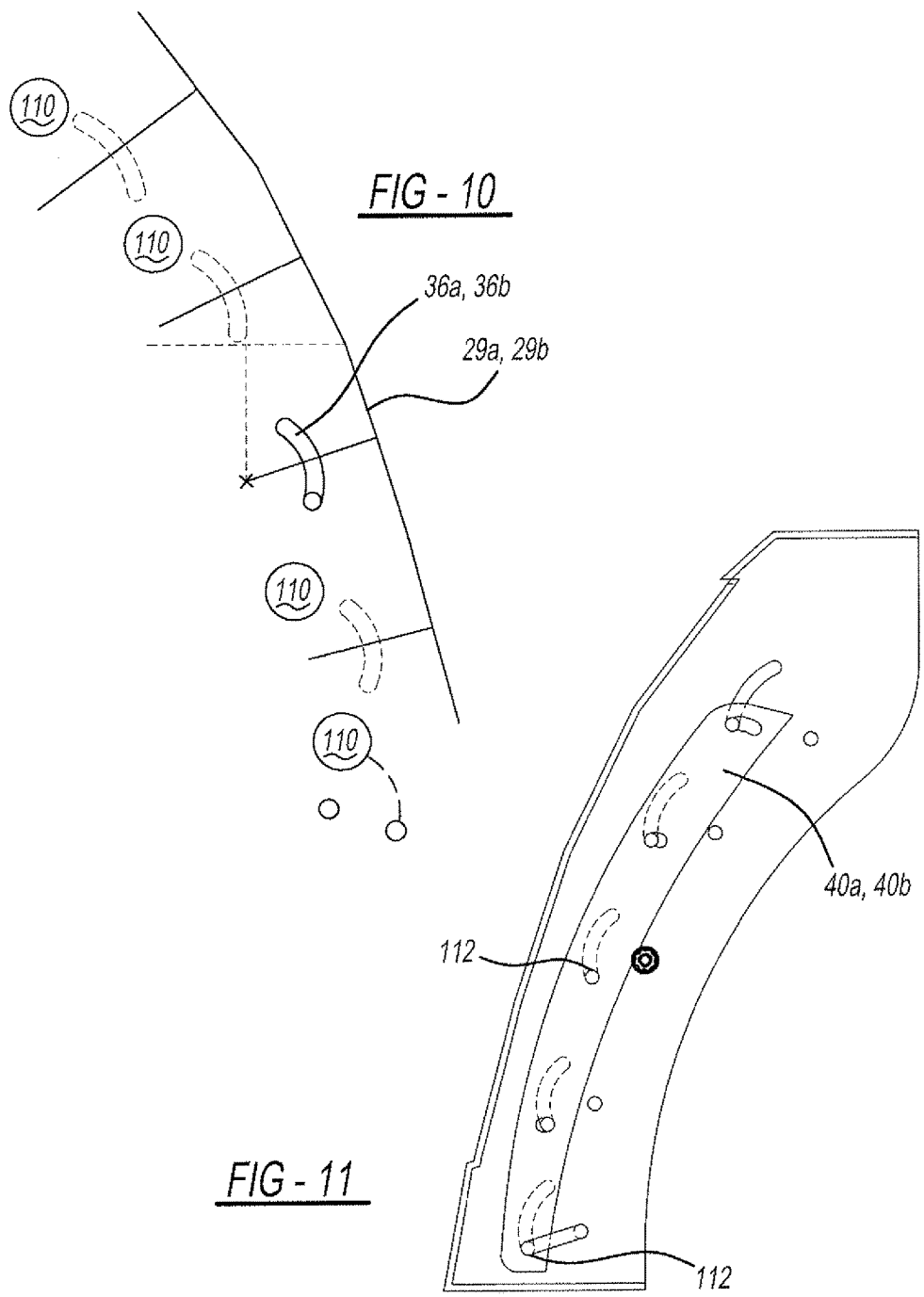

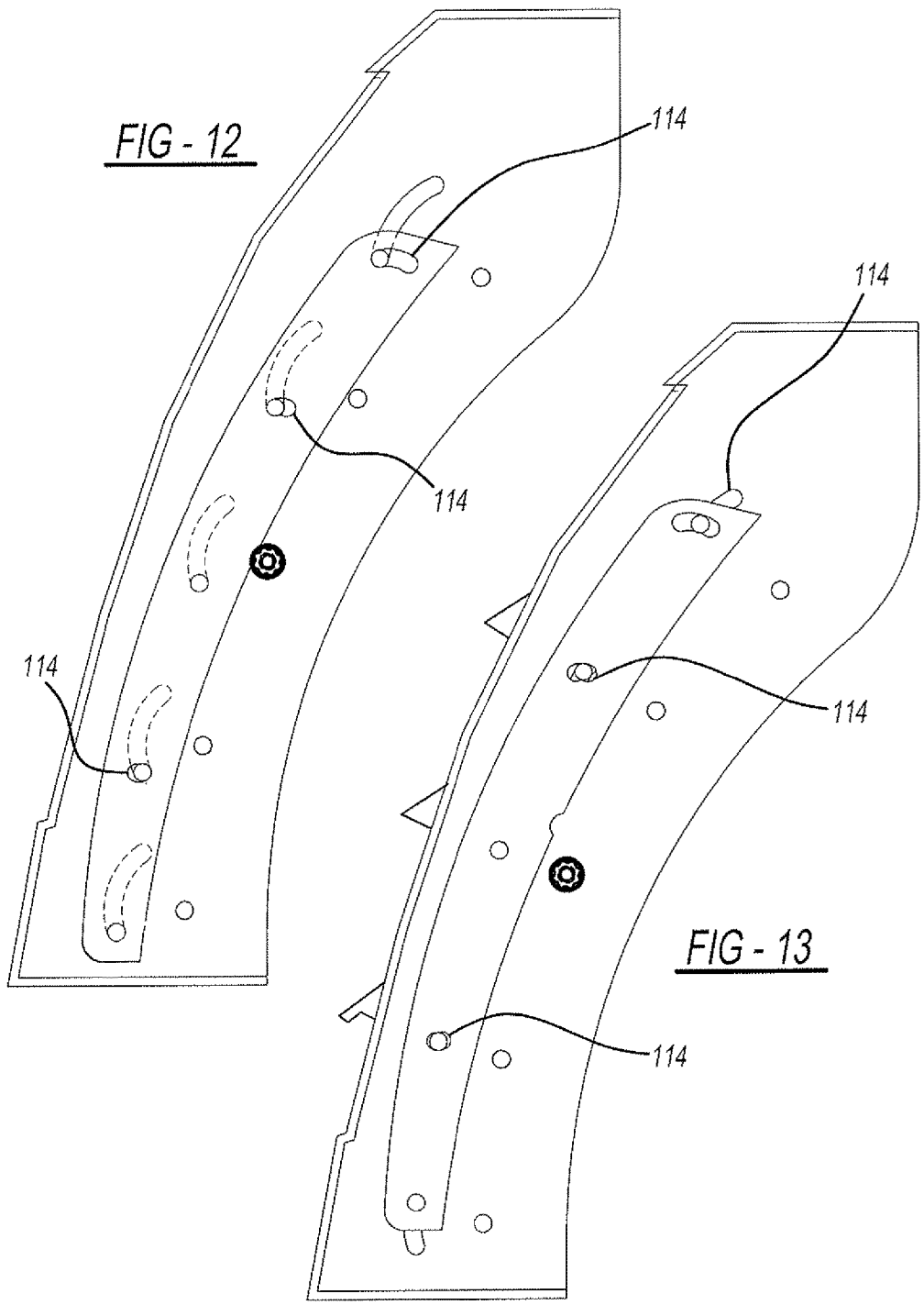

US 10,017,048 B2

ACTIVE GRILLE SHUTTER FOR CURVED SURFACE

This application is a National Stage of International Application No. PCT/US2015/029262, filed May 5, 2015. This application claims priority to Provisional Patent Application No. 61/988,513 filed on May 5, 2014. The disclosure(s) of the above application(s) is (are) incorporated herein by reference.

FIELD OF THE INVENTION

The present invention relates to an active grille shutter or vane system for a vehicle having a curvilinear exterior grille.

BACKGROUND OF THE INVENTION

Grille shutters should be placed as close to the A-surface of a vehicle as possible in order to provide the best aerodynamic benefit. Most vehicles do not have grille openings that are planar, therefore having an active grille shutter system that is flat or does not conform to the desired grille opening will compromise the aerodynamic benefits and creates an undesirable appearance, especially in applications where the active grille shutter system forms the A-surface of the vehicle. It is therefore desirable to provide an active grille shutter system that allows the vanes to follow a curve when closed, but sit parallel and remain behind the A-surface of the vehicle when open.

SUMMARY OF THE INVENTION

An active grille shutter system having a frame with a first side facing a vehicle exterior and a second side opposite the first side that faces a vehicle engine compartment. The frame also includes at least two opposing cross-sectional curvilinear sides that form part of a curvilinear opening to allow air to selectively pass through the frame from the first side to the second side. The term curvilinear opening as used herein is defined to mean that the vertical or horizontal cross-sectional shape of the first side, or front side opening formed by the frame consists of a curved line.

The active grille shutter system further includes two or more vanes each having a pivot pin and a guide pin formed on at least one end of each of the two or more vanes. Located at an opposing end of the two or more vanes is a pivot pin, whereby the two or more vanes are configured to extend across at least a portion of the curvilinear opening and are movable between an open position allowing air to flow past the two or more vanes and a closed position where the two or more vanes substantially close the curvilinear opening and prevent air from flowing past the vanes.

When the two or more vanes are closed they are in a curvilinear position that aligns the two or more vanes with the curved edges or sides located at the front of the frame such that the two or more vanes mimic the shape of the curvilinear opening of the frame. The frame also includes at least one vane mounting plate forming part of the frame and having a rotational aperture connected to the pivot pin and a curved slot connected to the guide pin of the respective pivot pin and guide pin on each one of the two or more rotational vanes.

A linkage bar is connected to the two or more vanes and has a round driving aperture for rotatably receiving the guide pin of one of the two or more vanes. There is an elongated slot rotatably connected to each one of the other two or more vanes and the linkage bar transfers and distributes force needed to open and close the two or more vanes between the two or more vanes.

BRIEF DESCRIPTION OF THE DRAWINGS

The present invention will become more fully understood from the detailed description and the accompanying drawings, wherein:

FIG. 1 is a rear angled perspective view of an active grille shutter system with the vanes in the open position in accordance with the present invention;

FIG. 2 is a is a cross-sectional side plan view of the active grille shutter system in accordance with the present invention;

FIG. 3 is a rear angled perspective view of the active grille shutter system with the vanes in the closed position in accordance with the present invention;

FIG. 4 is a is a cross-sectional side plan view of the active grille shutter system in accordance with the present invention;

FIG. 10 is a side schematic view showing the steps for designing the active grille shutter system in accordance with the present invention;

FIG. 11 is a side schematic view showing the steps for designing the active grille shutter system in accordance with the present invention;

FIG. 12 is a side schematic view showing the steps for designing the active grille shutter system in accordance with the present invention;

FIG. 13 is a side schematic view showing the steps for designing the active grille shutter system in accordance with the present invention.

DETAILED DESCRIPTION

Figure 5:
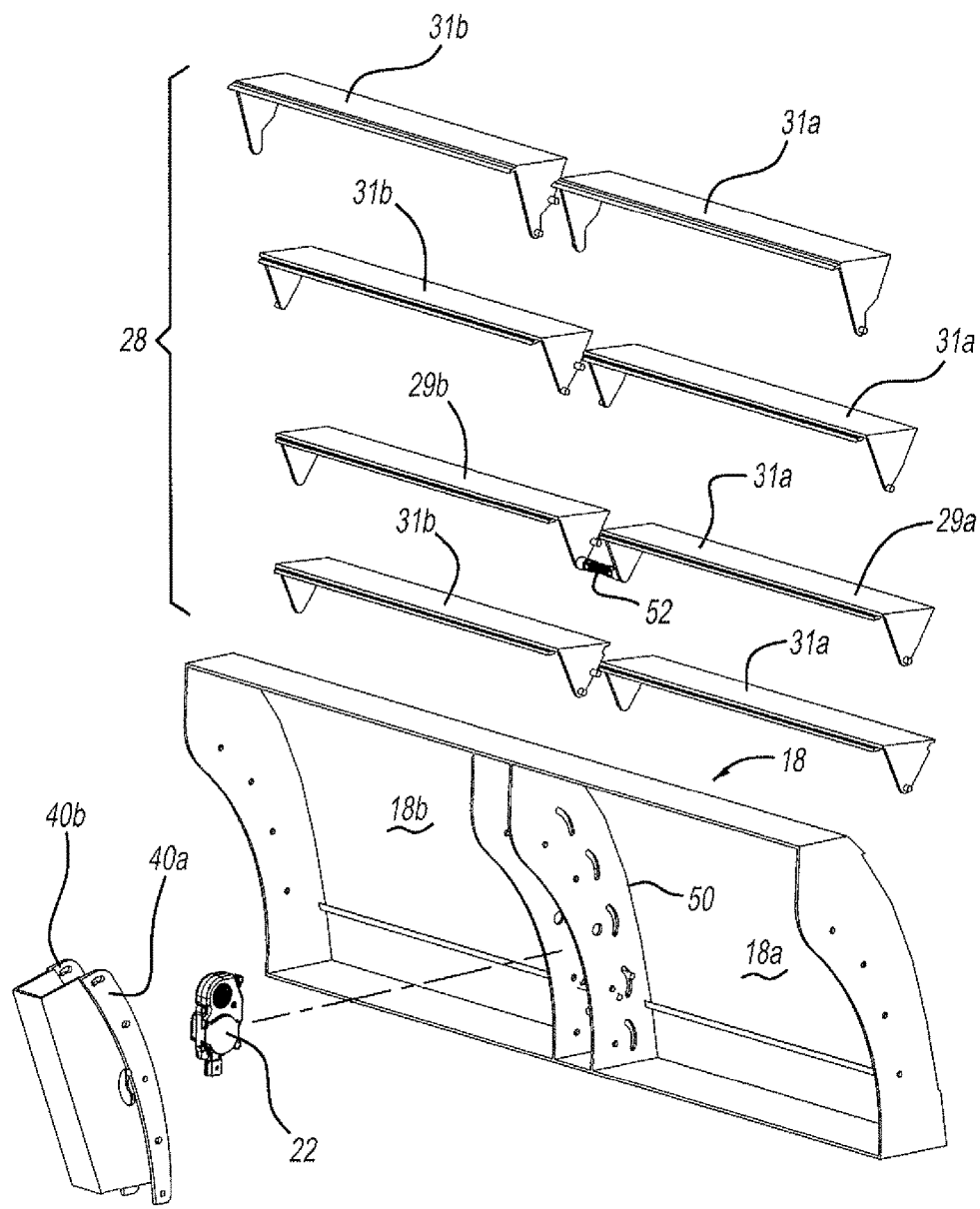
FIG. 5 is an exploded rear angled perspective view of the active grille shutter system.
Figure 6:
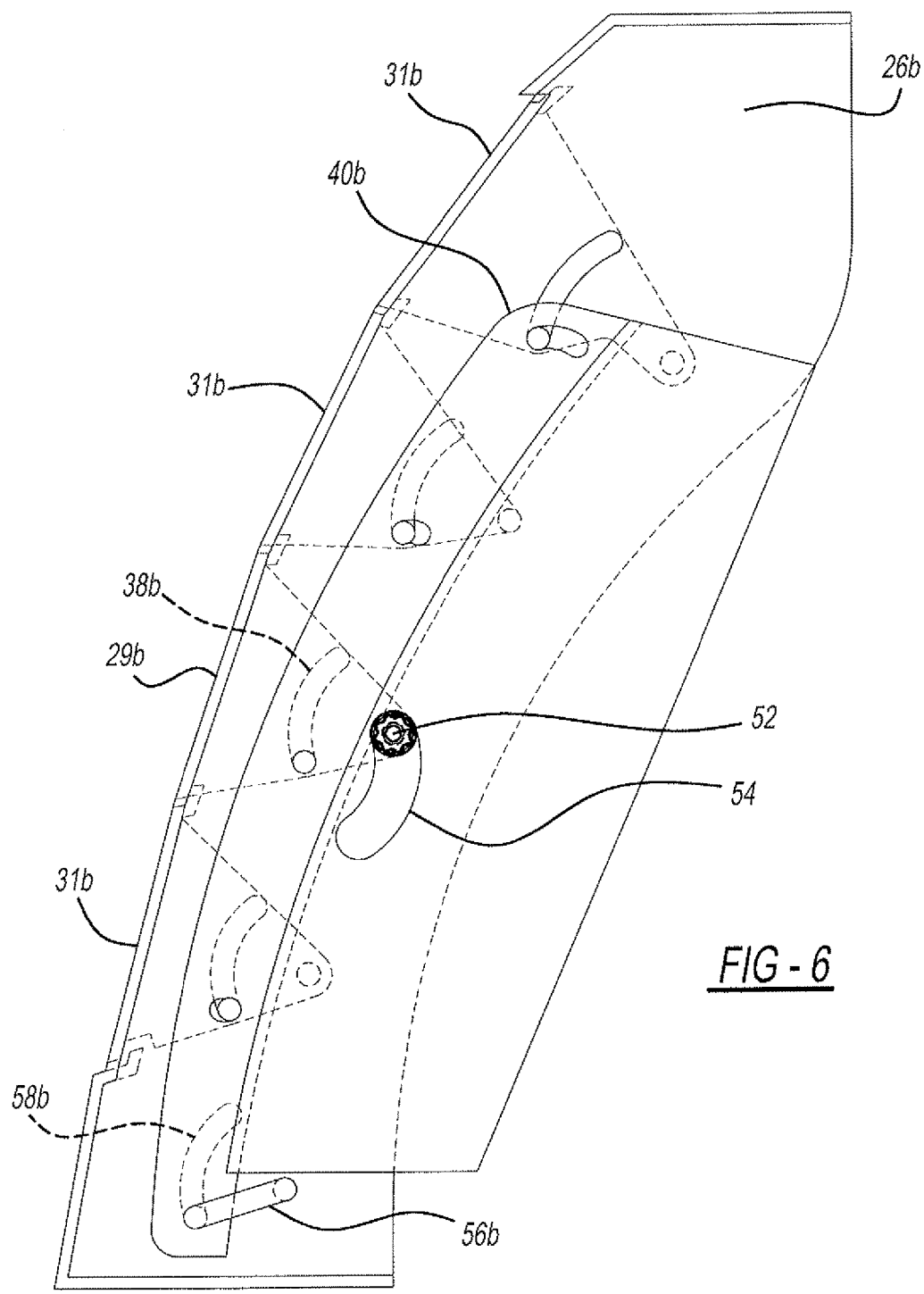
FIG. 6 is a is a cross-sectional side plan view of the active grille shutter system in accordance with the present invention.

The following description of the preferred embodiment(s) is merely exemplary in nature and is in no way intended to limit the invention, its application, or uses.

Referring now to the FIGS. 1-7 an active grille shutter system 10 is shown. The active grille shutter system 10 has a frame 12 with a first side 14, a second side 16, a top frame 60 and a bottom frame 62. The first side 14 faces a vehicle exterior surface or what is referred to as an A-surface of a vehicle. The active grille shutter system 10 can be a part of the vehicle grille or it can be located behind a vehicle grille. The second side 16 of the frame 12 is located opposite the first side 14 and is open to the engine compartment.

In the center of the frame 12 is a curvilinear opening 18 where air passes through the frame 12 from the first side 14 to the second side 16 as a vehicle moves. This allows for intake air to be introduced to an engine of the vehicle. In the present embodiment of the invention shown in FIGS. 1-7 the curvilinear opening 18 is divided by a center bar 20 portion of the frame 12 creating a left side curvilinear opening 18a and right side curvilinear opening 18b, which includes a left side frame 12a and right side frame 12b. An actuator 22 for the active grille shutter system 10 is mounted to the center bar 20. It is within the scope of this invention for there not to be a center bar 20 that divides the curvilinear opening 18 depending on the needs of a particular application. It is also within the scope of this invention for the additional center bars to be used that further subdivide the curvilinear opening into more sections. It is also within the scope of this invention for the center bar 20 to extend horizontally or at an angle across the curvilinear opening 18 and not just vertically as shown.

The left side frame 12a and left side curvilinear opening 18a are a mirror image of the right side curvilinear frame 12b and right side curvilinear opening 18b; therefore like components for the right side will be designated with the letter "b" and left side components will be designated with the letter "a".

Curvilinear openings 18a, 18b are defined to be at least two opposing cross-sectional curvilinear vane mounting plates 26a, 26b forming part of the center bar 20 and two curvilinear sides 38a, 38b of frame 12 are located at the opposite side of the curvilinear openings 18a, 18b from the respective two curvilinear mounting plate 26a, 26b, which together define at least part of a curvilinear openings 18a, 18b to allow air to selectively pass through the frame 12 from the first side 14 to the second side 16. Two or more vanes 28, also include a primary vane 29a, 29b and secondary vanes 31a, 31b. Additionally in certain embodiments of the invention an idler arm 56a, 56b is included in order to support and provide a smooth movement of the two or more vanes 28 between the open position in the closed position.

Each of the two or more vanes 28 have a pivot pin 30, 30' located at opposing ends of each of the two or more vanes 28. On one end, adjacent the center bar 20, each one of the secondary vanes 31a, 31b has a guide pin 32 that engages one of two or more curved slots 36a, 36b formed in the curvilinear vane mounting plates 26a, 26b. On one end, adjacent the center bar 20, each primary vane 29a, 29b has a guide pin 32 that engages one of one or more primary vane curved slots 39a, 39b, while one and of the idler arm 56a, 56b connects to an idler arm slot 58a, 58b. The curvature of the idler arm slot 58a, 58b is identical to the curvature of the one or more primary vane curved slots 39a, 39b. The idler arm 56a, 56b along with the primary drive pin 52 of the primary vane 29a, 29b provides a four arm link between the linkage bar 40a, 40b and the frame 12. This is necessary in order to provide a smooth movement of the vanes 28 between the open position and closed position.

It is also within the scope of this invention for each one of the two or more vanes 28 to have a pivot pin 30, 30' and guide pin 32 at each end of the two or more vanes depending on the needs of a particular application. For example in some applications the individual vanes can have significant length and would benefit from having both a pivot pin and guide pin at each end to support the size of the individual vane. In the present embodiment of the invention show in FIGS. 1-7, the vanes have a pivot pin 30' that is rotationally positioned in a rotational aperture 34a, 34b of the respective two curvilinear sides 38a, 38b but no guide pin is present at this side.

Figure 7:
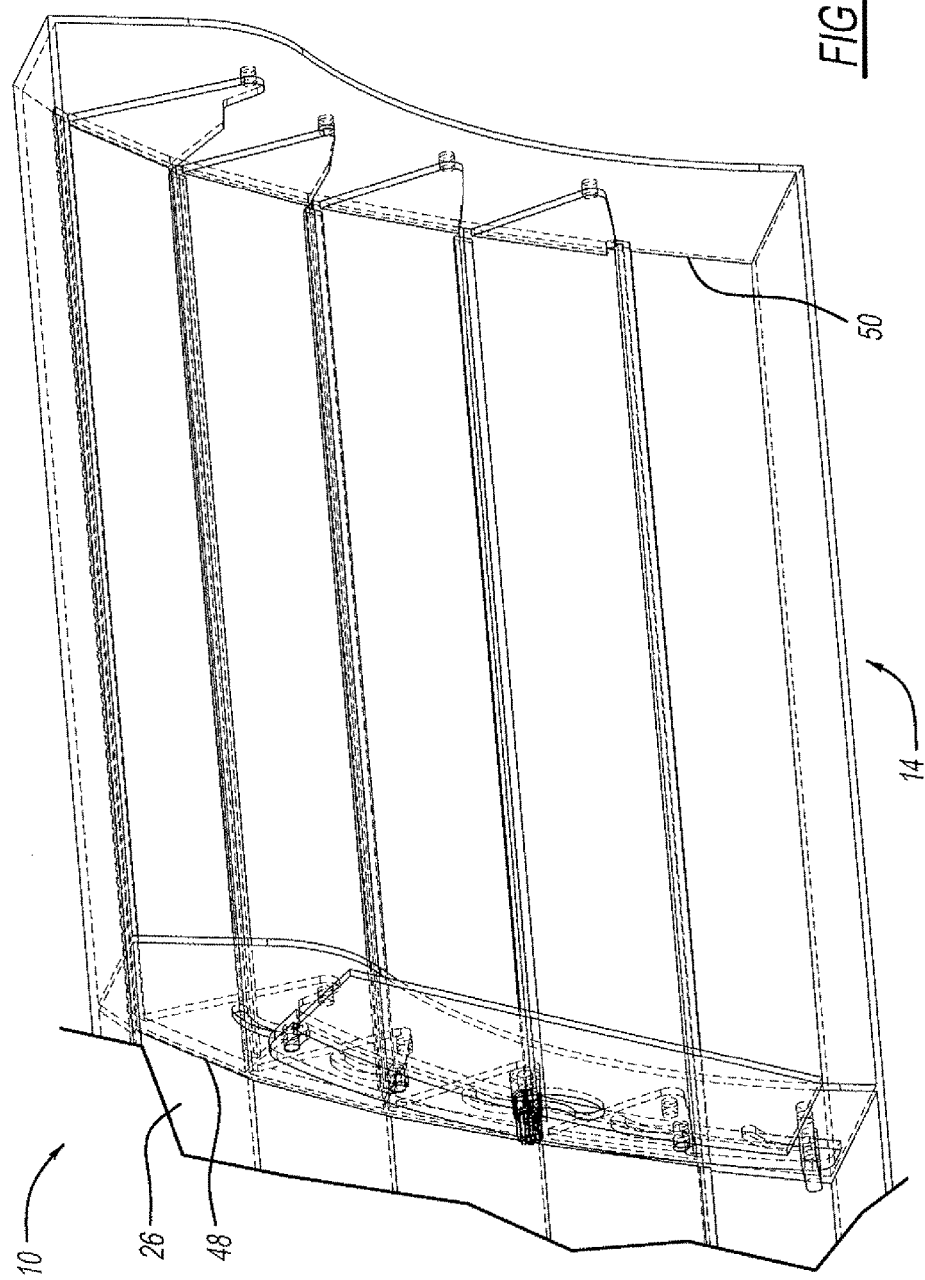
FIG. 7 is a front angled perspective view of the active grille shutter system with the vanes in the closed position in accordance with the present invention.
Figure 8:
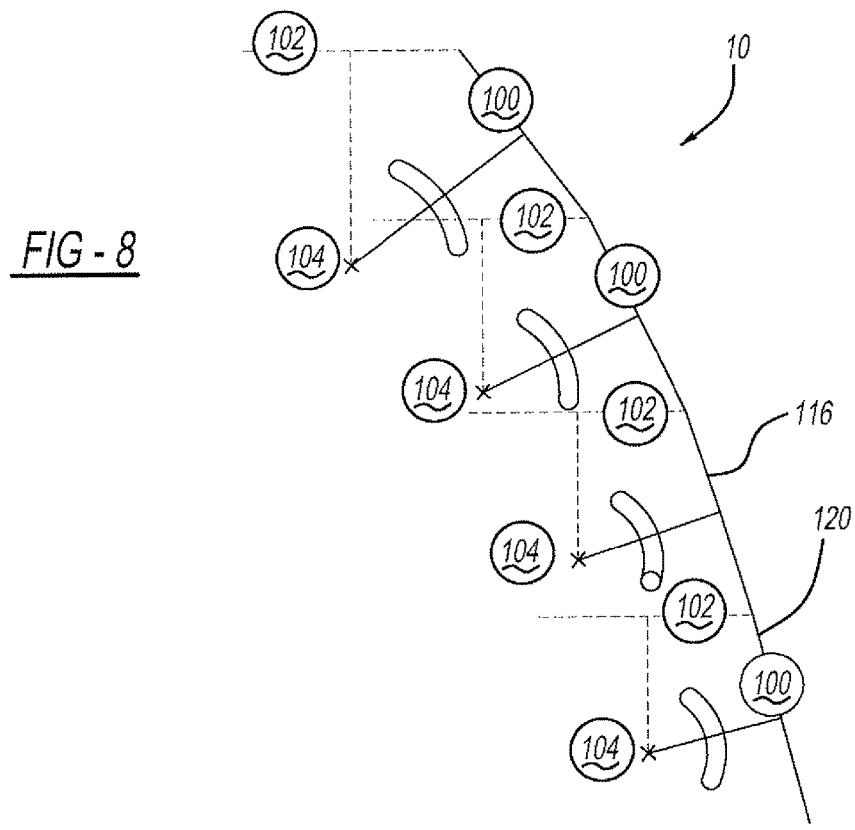
FIG. 8 is a side schematic view showing the steps for designing the active grille shutter system in accordance with the present invention.
Figure 9:
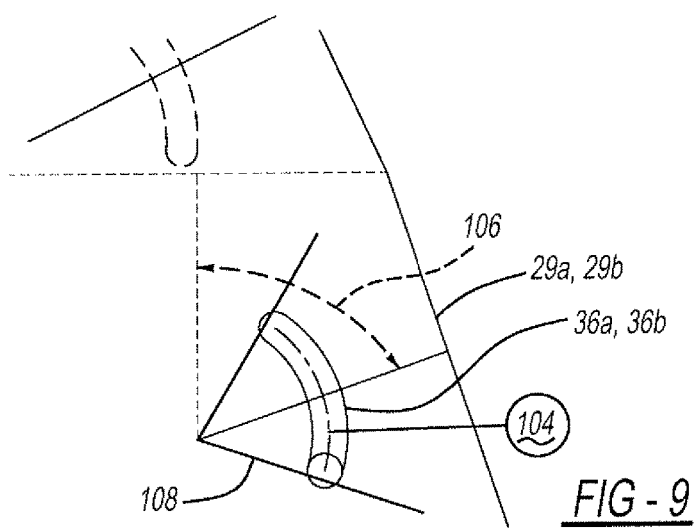
FIG. 9 is a side schematic view showing the steps for designing the active grille shutter system in accordance with the present invention.
Figure 14:
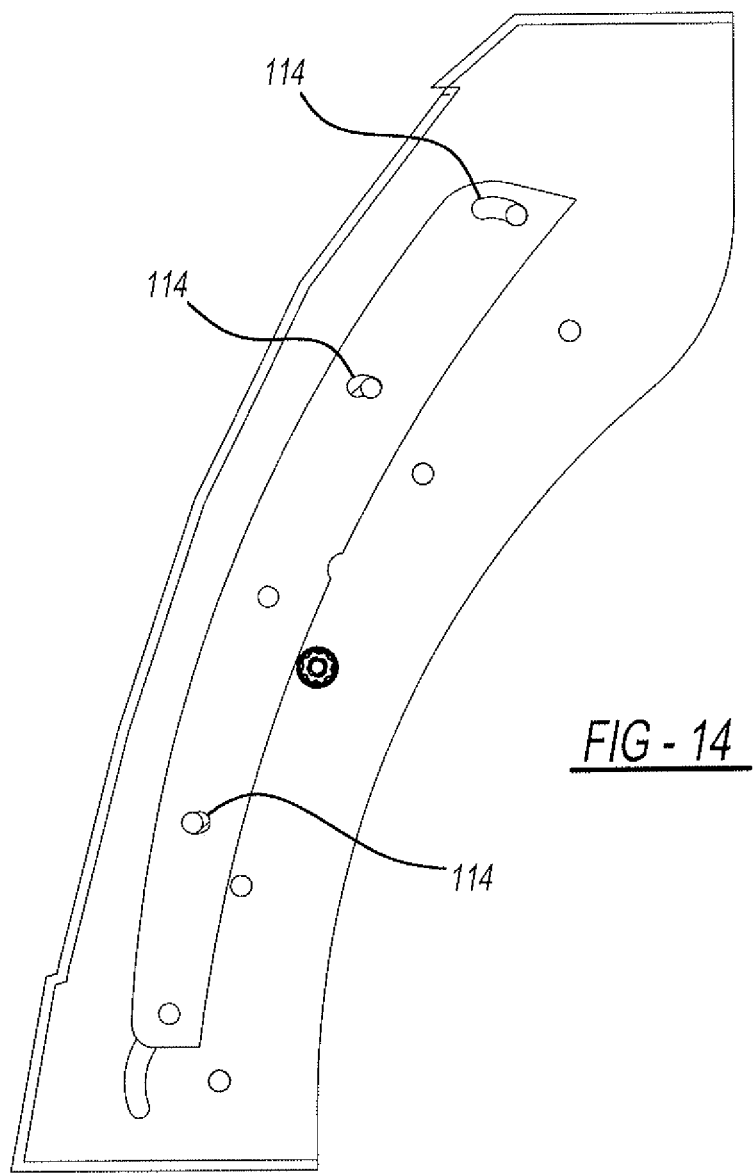
FIG. 14 is a side schematic view showing the steps for designing the active grille shutter system in accordance with the present invention.

The two or more vanes 28 extend across at least a portion of the curvilinear opening 18a, 18b and are moveable between a closed position and an open position. When moved to the closed position the two or more vanes 28 substantially close the curvilinear opening 18a, 18b and prevent air from flowing there through and close in a curvilinear position that aligns the two or more vanes 28 with the at least two opposing cross-sectional curved sides 38a, 38b creating a closed curvilinear surface 46, as shown in FIG. 7, where each of the two or more vanes 28 are positioned in a closed position that creates a curved line or curvilinear surface 46 closing the left opening 18a or right opening 18b depending on which set of the two or more vanes 28 are viewed.

The curvilinear surface 46 has a shape that generally matches a curved edge 48 of the at least two cross-sectional curvilinear vane mounting plates 26a, 26b. The two curvilinear sides 38a, 38b of frame 12 also each have a curved edge 50 that also curves at the same angle and shape as the curved edge 48. It is within the scope of this invention for the curved edge 50 to not be present or have a different shape than curved edge 48 because in some applications the two curvilinear sides 38a, 38b are located in a position, such as adjacent an inside surface of a vehicle fender panel or behind a head light outside of the visible perimeter of the vehicle grille.

When the two or more vanes 28 move from an open position to a closed position each vane rotates about the respective pivot pins 30, 30 and moves laterally with respect to the curvilinear opening 18a, 18b as shown in FIG. 2. While FIGS. 1-7 depict the vanes 28 in an open or closed position it is within the scope of this invention for the vanes to be rotated to any intermediate position between the open position and closed position. When rotated to the open position the two or more vanes 28 are arranged parallel to each other to allow air to pass through the curvilinear opening 18a, 18b, wherein when each one of the two or more vanes 28 move to the open position the two or more vanes move laterally with respect to the curvilinear opening 18a, 18b so that the two or more vanes 28 do not extend beyond the curved edge 48, curved edge 50 and first side 14 of the frame 12 when in the open position. The rotational and lateral movement is controlled by the curved slot 36a, 36b formed in the curvilinear vane mounting plates 26a, 26b.

The angle of each curved slot 36a, 36b, primary vane curved slots 39a, 39b can be different depending on the desired rotation of the vanes 28. FIGS. 8-14 shows the steps or method of determining the appropriate placement of the curved slot 36a, 36b and rotational apertures 34a, 34b for each respective one of the two or more vanes 28. At a first step 100 a determination is made regarding the desired number of vanes for the active grille shutter system 10, lines are drawn showing the location of each vane in a closed position. In the example shown there is one primary vane line 116, an upper secondary vane line 118 located above the primary vane line 116 and a lower secondary vane line 120 located below the primary vane line 116. It is within the scope of this invention for a greater or lesser number secondary vane lines and vanes to be included in design depending on a specific design. A second step 102 involves drawing lines where the vanes are positioned in a desired open position.

A third step 104 involves drawing perpendicular by sectors of each vane pair in order to designate pivot axis position or proper location of the rotational apertures 34a, 34b and pivot pin 30, 30' for each one of the two or more vanes 28. Next at a fourth step 106 the corresponding angle of rotation of the primary vane 29a, 29b is determined. During a fifth step 108 the shape of the curved slot 36a, 36b is generated from sweeping a desired link arm, from the fourth step 106 through the angle to determine the path required of the primary vane 29a, 29b.

During a sixth step 110 a cord line is drawn between the start and end points of the arc shape of the curved slot 36a, 36b for the primary vane 29a, 29b. At a seventh step 112 the linkage bar rotatably connects to the guide pins of the primary vane by respective cylindrical holes in the linkage bar. The idler link has one end that rotatably connects to the linkage bar using respective cylindrical holes in the linkage bar. However if one set of the secondary vanes has a path of rotation identical to the primary vane, the use of an idler link is not necessary because the secondary vane having the exact same path of rotation will also be connected to respective cylindrical holes on the linkage bar.

During an eighth step 114 the relative vane positions are mapped for the secondary vanes as a percentage of the rotation from open position to close position, in degrees, and the center points of each pivot pin 30, 30', at each angle of rotation are listed. The secondary vane 31a, 31b connections to the linkage bar 40a, 40b create arcs in the linkage bar 40a, 40b.

The cord lines drawn for the primary vane 29a, 29b at the sixth step 112 are then copied to all other curved slots 36a, 36b, as a base of an isosceles triangle with vertex at each vane's pivot axis or location of pivot pin 30, 30', and angle at vertex is equal to a desired angle of rotation. In order to carry out the above described methods it is important that all of the cord lines are drawn parallel to each other and are of equal length. Secondly the lines drawn between each pivot and link axes are not be necessarily parallel, unless vanes are planar.

Using the above method of determining the appropriate placement of the curved slot 36a, 36b, primary vane curved slots 39a, 39b, idler arm slot 58a, 58b and rotational apertures 34a, 34b provides an active grille shutter system 10 that has two or more vanes are vanes 28 that rotate between the closed position and open position the vanes also do not extend beyond the first side 14 of the frame 12 because the path of the curved slot 36a, 36b for each individual vane is design to prevent the two or more vanes 28 from rotating beyond the first side 14 even when the first side 14 has a curvilinear cross-section (i.e., cross-sectional angle of first side 14 as shown in FIG. 2) that has angles.

Rotation of the two or more vanes 28 is driven by the actuator 22 acting on the primary vane 29a, 29b. Generally there is one driven primary vane per set of two or more vanes; however it is within the scope of this invention for there to be more than one or for all of the vanes to be driven by the actuator. The rotational force of the actuator acting on the driven vanes is transferred to all of the secondary vanes 31a, 31b by a linkage bar 40a, 40b connected between the primary vanes 29a, 29b and the secondary vanes 31a, 31b and the at least one vane mounting plate 26a, 26b of the center bar portion 20 of the frame 12. The linkage bar 40a, 40b has a round driving aperture 42 for rotatably receiving the guide pin 32 of the primary vane 29a, 29b. The curvature of each secondary vane curved slot 36a, 36b is different from the primary vane curved slot 39a, 39b, therefore the guide pin 32 of one of each of the secondary vanes 31a, 31b is received in the curved slot 36a, 36b in order to provide enough tolerance to smoothly translate the rotational force from the primary vane 29a, 29b to the secondary vanes 31a, 31b through the linkage bar 40a, 40b and prevent the active grille shutter system 10 from locking up when the vanes move between an open position and a closed position.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An active grille shutter system comprising:
   a frame with a first side and a second side, the frame has a first side facing a vehicle exterior and a second side opposite the first side, at least two opposing cross-sectional curvilinear sides that form at least part of a curvilinear opening to allow air to selectively pass through the frame from the first side to the second side;
   two or more vanes each having a pivot pin and a guide pin formed on at least one end of each of the two or more vanes, wherein the two or more vanes extend across at least a portion of the curvilinear opening, the two or more vanes being moveable between an open position allowing air to flow past the two or more vanes and a closed position where the two or more vanes substantially close the curvilinear opening and prevent air from flowing therethrough, wherein the two or more vanes close in a curvilinear position that aligns the two or more vanes with the at least two opposing cross-sectional curvilinear sides of the frame, and
   at least one vane mounting plate forming part of the frame and having a a plurality of rotational apertures and a plurality of curved slots, wherein a set of one of the plurality of rotational apertures and one of the plurality of curved slots connects to one of the two or more vanes such that the pivot pin of the one of the two or more vanes connects to the one of the plurality of rotational apertures of the set and the guide pin of the one of the two or more vanes connects to the one of the plurality of curved slots of the set; and
   a linkage bar connected to the two or more vanes, wherein the linkage bar has a round driving aperture for rotatably receiving the guide pin of one of the two or more vanes and an elongated slot for rotatably connecting each one of the other two or more vanes, wherein the linkage bar transfers and distributes force needed to open and close the two or more vanes between the two or more vanes.

2. The active grille shutter system of claim 1 wherein the two or more vanes are arranged to rotate along a path of rotational movement and form a cross-sectional line that matches the curvilinear opening when the two or more vanes move to the closed position, wherein the two or more vanes do not extend beyond the first side of the frame when closed and when moving between the open position to the closed position.

3. The active grille shutter system of claim 2 wherein a path of rotational movement is defined by the guide slot and the linkage bar guides the two or more vanes along the path of rotational movement.

4. The active grille shutter system of claim 1 wherein the two or more vanes when in the open position are arranged parallel to each other to allow air to pass through the curvilinear opening, wherein when each one of the two or more vanes move to the open position from a closed position the two or more vanes move with respect to the curvilinear opening so that the two or more vanes do not extend beyond the first side of the frame during movement.

5. The active grille shutter system of claim 1 further comprising an idler link bar connected between the at least one vane mounting plate and the linkage bar, wherein the idler link bar is configured to rotate and move with the linkage bar when the at least two vanes move between the open and closed positions.

6. The active grille shutter system of claim 1 further comprising an actuator connected to one of the two or more vanes, wherein the actuator rotates the one of the two or more vanes and force is transferred from the one of the two or more vanes through the linkage bar to all other the two or more vanes.

7. An active grille shutter system comprising:
a frame with a first side and a second side, the frame has a first side facing a vehicle exterior and a second side opposite the first side, at least two opposing cross-sectional curvilinear sides that form at least part of a curvilinear opening to allow air to selectively pass through the frame from the first side to the second side;
a rotary actuator connected to the frame;
a primary vane having a pivot pin and a guide pin formed on at least one end of the primary vane, wherein the primary vane extends across at least a portion of the curvilinear opening, the primary vane is movable between an open position allowing air to flow past the primary vane and a closed position where the primary vane substantially closes a portion of the curvilinear opening and prevents air from flowing therethrough, wherein the primary vane closes in a curvilinear position and the primary vane is connected to the rotary actuator that provides rotational force to the primary vane causing the primary vane to move between the open position and the closed position;
two or more secondary vanes each having a pivot pin and a guide pin formed on at least one end of each of the two or more secondary vanes, wherein the two or more secondary vanes extend across at least a portion of the curvilinear opening, the two or more secondary vanes being moveable between an open position allowing air to pass the two or more secondary vanes and a closed position where the two or more secondary vanes substantially close the curvilinear opening and prevent air from flowing there through, wherein the two or more secondary vanes close in a curvilinear position that aligns the two or more secondary vanes with the at least two opposing cross-sectional curvilinear sides of the frame;
at least one vane mounting plate forming part of the frame and having a rotational aperture connected to the pivot pin and a curved slot connected to the guide pin of the primary vane and a rotational aperture connected to the pivot pin and a curved slot connected to the guide pin of each two or more secondary vanes; and
a linkage bar connected to the primary vane and each of the two or more secondary vanes, wherein the linkage bar has a round driving aperture for rotatably receiving the guide pin of the primary vane and one or more elongated slots for rotatably receiving the guide pin of a respective one of the two or more secondary vanes, wherein the linkage bar transfers and distributes opening force and closing force from the primary vane to the two or more secondary vanes.

8. The active grille shutter system of claim 7 further comprising an idler link bar connected between the at least one vane mounting plate and the linkage bar, wherein the idler link bar is configured to rotate and move with the linkage bar when the primary vane and the two or more secondary vanes move between the open and closed positions.

9. The active grille shutter system of claim 8 wherein the idler link bar slides within a curved slot formed in the at least one vane mounting plate, wherein the curved slot that the idler link bar slides in is identical in shape to the curved slot of the primary vane.

10. The active grille shutter system of claim 7 wherein the primary vane and two or more secondary vanes are arranged to rotate along a path of rotational movement and form a cross-sectional line that matches the curvilinear opening when the primary vane and two or more secondary vanes move to the closed position, wherein the primary vane and two or more secondary vanes do not extend beyond the first side of the frame when closed and when moving between the open position to the closed position.

11. The active grille shutter system of claim 10 wherein a path of rotational movement is defined by the guide slot and the linkage bar guides the primary vane and two or more secondary vanes along the path of rotational movement.

12. The active grille shutter system of claim 7 further comprising a round stabilization aperture formed through the linkage bar for connecting to the guide pin of the other one of the two or more secondary vanes, wherein the guide pin connected to the stabilization aperture is connected to the curved slot in the at least one vane mounting plate that is identical in shape to the curved slot connected to the guide pin of the primary vane.

13. The active grille shutter system of claim 7 wherein the primary vane and two or more secondary vanes, when in the open position are arranged parallel to each other to allow air to pass through the curvilinear opening, wherein when each one of the primary vane and two or more secondary vanes move to the open position from a closed position the two or more vanes move with respect to the curvilinear opening so that the primary vane and two or more secondary vanes do not extend beyond the first side of the frame during movement.

14. The active grille shutter system of claim 7 wherein the rotary actuator rotates the primary vane and force is transferred from the primary vane to the two or more secondary vanes through the linkage bar.

15. An active grille shutter system comprising:
a frame with a first side and a second side, the frame has a first side facing a vehicle exterior and a second side opposite the first side, at least two opposing cross-sectional curvilinear sides that form at least part of a curvilinear opening to allow air to selectively pass through the frame from the first side to the second side;
a rotary actuator connected to the frame;
a primary vane having a pivot pin and a guide pin formed on at least one end of the primary vane, wherein the primary vane extends across at least a portion of the curvilinear opening, the primary vane is movable between an open position allowing air to flow past the primary vane and a closed position where the primary vane substantially closes a portion of the curvilinear opening and prevents air from flowing therethrough, wherein the primary vane closes in a curvilinear position and the primary vane is connected to the rotary actuator that provides rotational force to the primary vane causing the primary vane to move between the open position and the closed position;
two or more secondary vanes each having a pivot pin and a guide pin formed on at least one end of the two or more secondary vanes, wherein the two or more secondary vanes extend across at least a portion of the curvilinear opening, the two or more secondary vanes being moveable between an open position allowing air to pass the two or more secondary vanes and a closed position where the two or more secondary vanes substantially close the curvilinear opening and prevent air from flowing there through, wherein the two or more secondary vanes close in a curvilinear position that aligns the two or more secondary vanes with the at least two opposing cross-sectional curvilinear sides of the frame, at least one vane mounting plate forming part of the frame and having a plurality of rotational apertures and a plurality of curved slots, wherein a first set of one of the plurality of rotational apertures and one of the plurality of curved slots connects to the primary vane such that the pivot pin on the primary vane connects to the one of the plurality of rotational apertures of the first set and the guide pin of the primary vane connects to the one of the plurality of curved slots of the first set and a second set of one of the plurality of rotational apertures and one of the plurality of curved slots connects to one of the two or more secondary vanes such that the pivot pin of the one of the two or more secondary vanes connects to the one of the plurality of rotational apertures of the second set and the guide pin of the one of the two or more secondary vanes connects to the one of the plurality of curved slots of the second set;

a linkage bar connected to the primary vane and each of the two or more secondary vanes, wherein the linkage bar has a round driving aperture for rotatably receiving the guide pin of the primary vane and one or more elongated slots for rotatably receiving the guide pin of a respective one of the two or more secondary vanes, wherein the linkage bar transfers and distributes opening force and closing force from the primary vane to the two or more secondary vanes; and an idler link bar connected between the at least one vane mounting plate and a round aperture formed in the linkage bar, wherein the idler link bar is configured to rotate and move with the linkage bar when the primary vane and two or more secondary vanes move between the open and closed positions.

16. The active grille shutter system of claim 15 wherein the primary vane and two or more secondary vanes are arranged to rotate along a path of rotational movement and form a cross-sectional line that matches the curvilinear opening when the primary vane and two or more secondary vanes move to the closed position, wherein the primary vane and two or more secondary vanes do not extend beyond the first side of the frame when closed and when moving between the open position to the closed position.

17. The active grille shutter system of claim 16 wherein a path of rotational movement is defined by the guide slot and the linkage bar guides the primary vane and the two or more secondary vanes along the path of rotational movement.

18. The active grille shutter system of claim 15 wherein the primary vane and two or more secondary vanes, when in the open position are arranged parallel to each other to allow air to pass through the curvilinear opening, wherein when each one of the primary vane and two or more secondary vanes move to the open position from a closed position the two or more vanes move with respect to the curvilinear opening so that the primary vane and two or more secondary vanes do not extend beyond the first side of the frame during movement.

19. The active grille shutter system of claim 15 wherein the idler link bar slides within a curved slot formed in the at least one vane mounting plate, wherein the curved slot that the idler link bar slides in is identical in shape to the curved slot of the primary vane.

20. The active grille shutter system of claim 15 wherein the rotary actuator rotates the primary vane and force is transferred from the primary vane to the two or more secondary vanes through the linkage bar.

* * * * *